Oct. 9, 1956      L. G. SIMJIAN      2,765,705

POSE-REFLECTING CAMERA

Filed Dec. 8, 1953      4 Sheets-Sheet 1

INVENTOR
LUTHER G. SIMJIAN

BY *Ralph E. Bitner*

ATTORNEY

Oct. 9, 1956  L. G. SIMJIAN  2,765,705
POSE-REFLECTING CAMERA
Filed Dec. 8, 1953  4 Sheets-Sheet 2
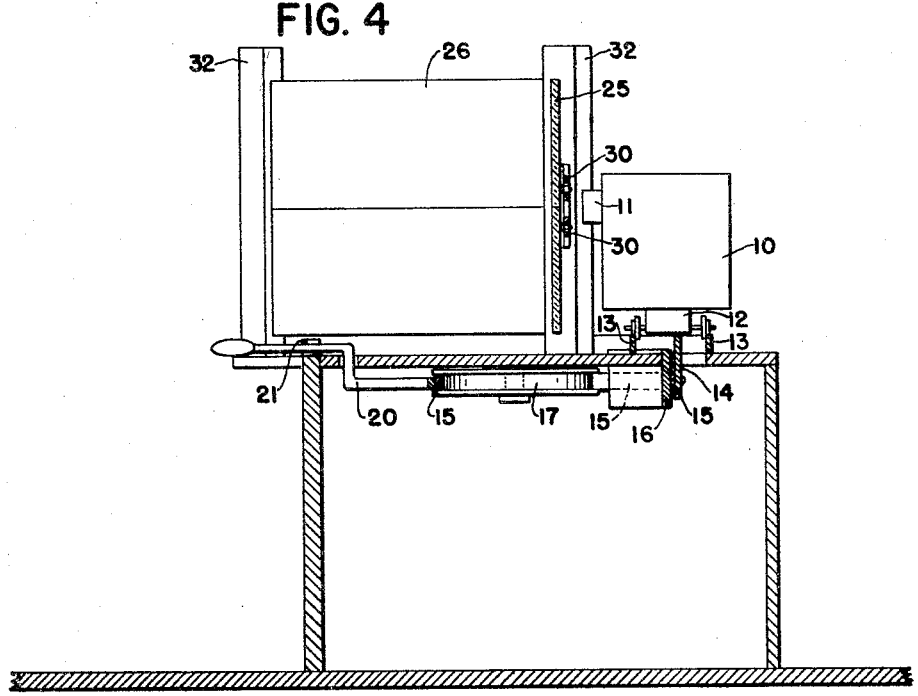
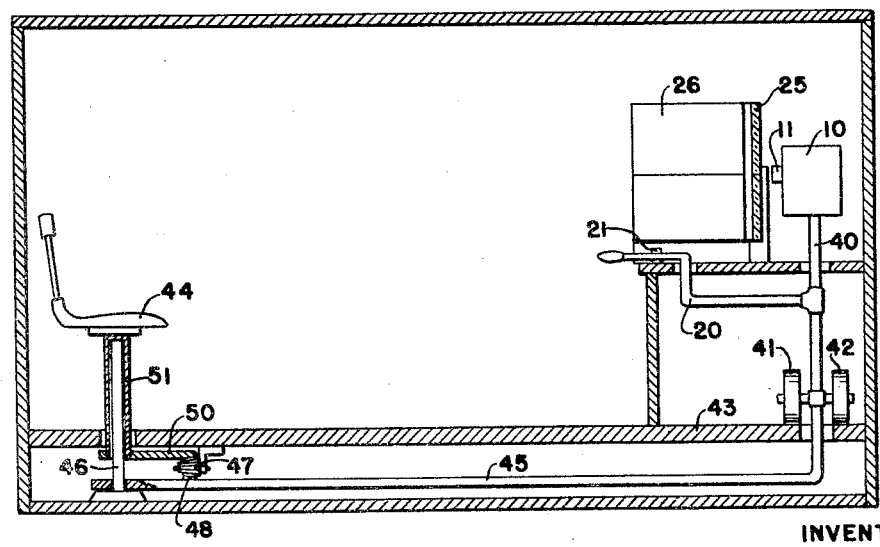
INVENTOR
LUTHER G. SIMJIAN
BY Ralph E. Bitner
ATTORNEY Oct. 9, 1956    L. G. SIMJIAN    2,765,705
POSE-REFLECTING CAMERA
Filed Dec. 8, 1953    4 Sheets-Sheet 3
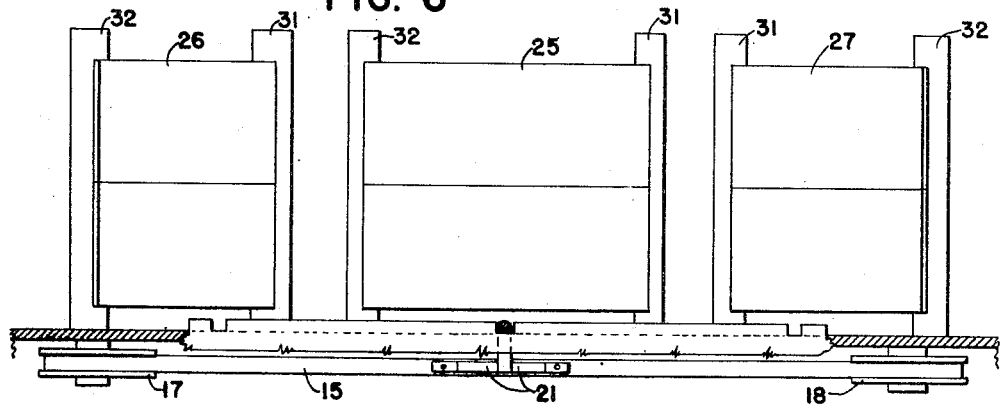
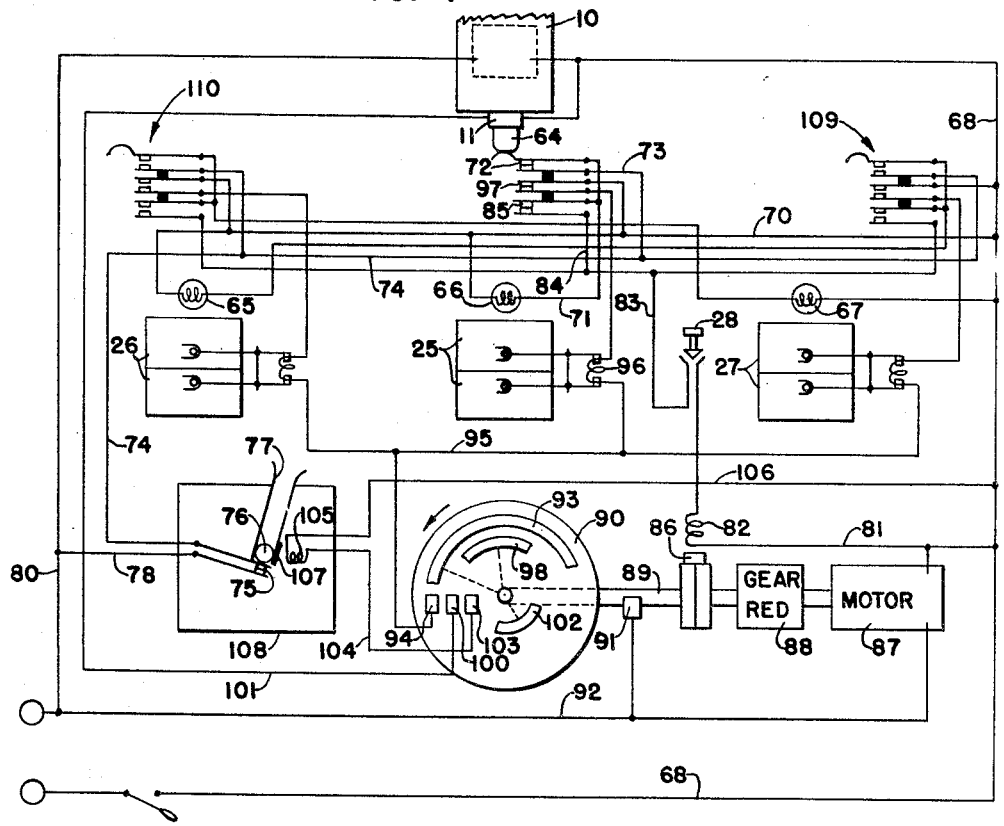
INVENTOR
LUTHER G. SIMJIAN
BY Ralph W. E. Bitner
ATTORNEY Oct. 9, 1956  L. G. SIMJIAN  2,765,705
POSE-REFLECTING CAMERA
Filed Dec. 8, 1953  4 Sheets-Sheet 4

INVENTOR
LUTHER G. SIMJIAN
BY Ralph E. Bitner
ATTORNEY

United States Patent Office 2,765,705
Patented Oct. 9, 1956

2,765,705

POSE-REFLECTING CAMERA

Luther G. Simjian, Greenwich, Conn.

Application December 8, 1953, Serial No. 396,798

7 Claims. (Cl. 88—74)

This invention relates to photographic apparatus and has particular reference to pose-reflecting arrangements wherein a person to be photographed can view his reflected image in a mirror just prior to a camera exposure. This apparatus enables a person to modify or alter the pose to secure the most gratifying results in the photographic record both in the front view and in profile.

The present invention is an improvement over the devices disclosed and claimed in United States Patents Nos. 2,625,857, issued January 20, 1953, and 1,709,598 issued April 16, 1929. These patents disclose novel means for photographing a subject who is able to view himself in a mirror just prior to the exposure of a recording camera. The present invention extends this pose-reflecting device so that a person's profile may be photographically recorded by an arrangement which comprises two stationary mirrors and which includes the examination and adjustment of a pose as reflected by the two mirrors placed in front of the camera positions.

One of the objects of this invention is to provide an improved pose-reflecting camera which avoids one or more of the disadvantages and limitations of prior art arrangements.

Another object of the invention is to enable a person who is being photographed to see himself in a mirror in substantially the exact pose which will be recorded by the camera, both for front view photographs and for profiles.

Another object of the invention is the use of multiple reflections from two or more mirrors which will enable a person to pose and then photographically record either a right hand profile or a left hand profile.

Another object of the invention is to arrange a pose-reflecting camera system so that pictures may be taken from at least three different camera positions, each of said positions controlled so as to insure the correct operation of the camera.

Another object of the invention is to provide a pose-reflecting camera system with a coin-operated attachment.

Another object of the invention is to provide a movable chair where a person to be photographed is positioned and to turn this chair in a direction which indicates which profile is to be photographed.

The invention includes three mirrors, each positioned in front of a camera position with means for moving a single camera to any one of the three positions. One of said mirrors reflects a pose which is a front view of the subject. Either one of the other two mirrors reflects a profile of the subject after it has been reflected by the other mirror and therefore permits the photographic recording of either a right or left side profile.

For a better understanding of the present invention, together with other and further objects thereof, reference is made to the following description taken in connection with the accompanying drawings.

Fig. 4 is a sectional view of the camera system shown in Fig. 1 taken along line 4—4 of that figure.

Fig. 5 is a cross sectional view similar to Fig. 4 but showing the entire camera arrangement including the chair for the person to be photographed and showing the method of positioning the chair when a profile is to be taken.

Fig. 6 is a front view of the camera system showing the three mirrors and part of the mechanism which moves the camera.

Fig. 7 is a wiring diagram showing the electrical controls which enable an operator to photograph himself.

Figure 1:
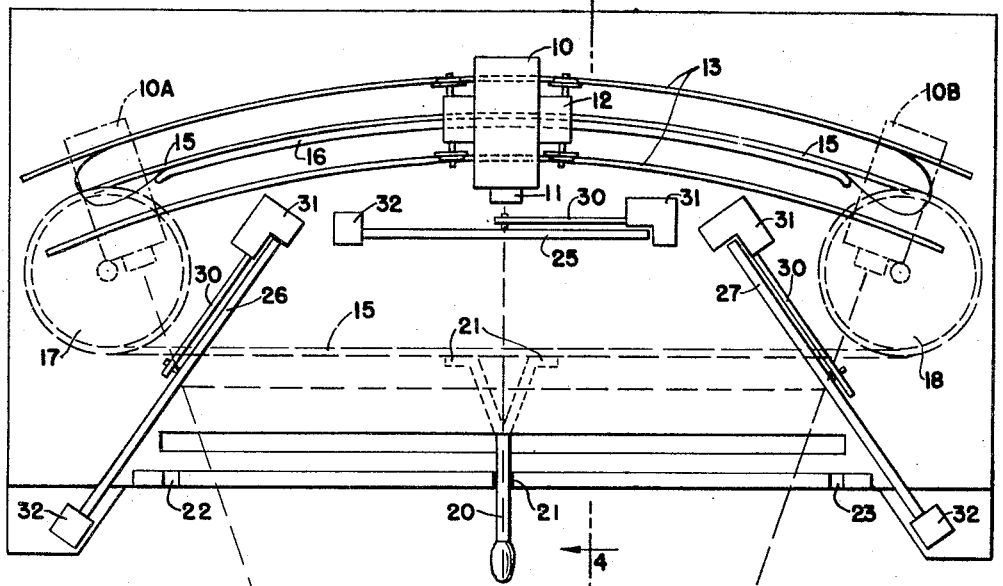
Fig. 1 is a top view of the camera system showing the three mirrors and some of the mechanism which controls the camera movement.

Referring now to Figs. 1, 4, and 6, an arrangement is shown whereby a camera 10 having a lens mount 11 is secured to a carriage 12 mounted on four wheels which roll on a track 13. The carriage 12 is secured to a vertical rod 14 which is attached to a belt 15 sliding on a circular guide 16 positioned underneath the camera and which is engaged by two pulleys 17 and 18. The movement of belt 15 is controlled by an arm 20 which is secured to the belt by a divided bracket 21. Arm 20 is arranged to drop into one of three slots 21, 22, or 23 so as to provide a definite and accurate position for the camera 10 in either one of three positions. The circular track 13 is part of a circle which has its center at a point 24 which is designated the object position and is the place where a subject is placed for photographic recording. It will be obvious that the circular track 13 provides a directive means for pointing the camera at the object position 24 no matter where the camera is placed.

When the camera 10 is in the position as shown in Fig. 1 a mirror 25 is directly in front of the camera lens 11 and is arranged so that a person at position 24 will see himself in the mirror in substantially the same pose as will be recorded by the camera. The arrangement of the camera and mirror in this position has already been disclosed in the above mentioned Patent 2,625,857. It will be obvious that the resulting picture will be a full or front view of the subject.

In order to record a profile view of the subject two additional mirrors 26 and 27 are mounted on the right and left hand sides of the central mirror 25 and positioned at an angle so that a person sitting at position 24 may look toward either one of mirrors 26, 27 and see his profile as reflected from the other mirror. In order to photograph a right profile the subject will look at mirror 26 and see the right side of his face as reflected successively by mirrors 27 and 26. To record a left profile the subject will turn to the right and look at mirror 27.

The operation of the profile recording is as follows. If the subject desires a photograph of his left profile the arm 20 is lifted from slot 21 and moved to the right until it is retained by slot 23. When this is done the belt 15 is moved in a counter-clockwise direction around pulleys 17, 18 and the camera 10 together with its carriage 12 is moved to position 10A shown in Fig. 1 in dotted lines. Then facing mirror 27 the subject operates a manual switch 28 (shown in Fig. 7), the mirror 26 will then be open by a mechanism which will be described hereinafter, the camera shutter is opened and closed and the profile view is recorded. Since the arrangement of mirrors and camera positions is symmetrical a right hand profile can be recorded by moving the arm 20 to slot 22 thereby moving the camera to position 10B and observing the right hand profile of the subject in mirror 26.

Fig. 1 shows the top view of two mirror arms 30 secured to each of the three mirrors. These arms are secured to stub shafts which are mounted on the back of each component of the split mirrors and are arranged to be actuated by a solenoid housed in compartments 31. In order to insure that the mirror sections will move to and from each other during an exposure interval in substantially parallel movement a linkage is arranged between the mirror sections and housed in compartment 32. The details of this mechanism are not shown in the drawings because they are fully described and illustrated in the above mentioned Patent No. 2,625,857.

Figure 2:
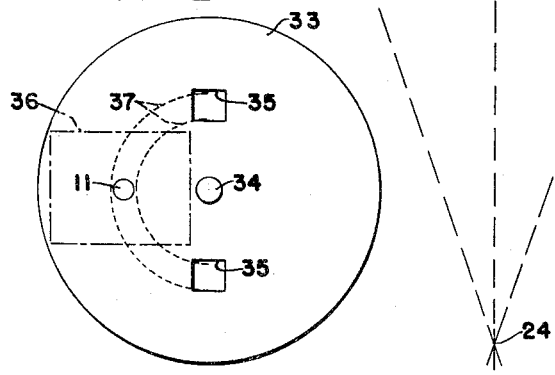
Fig. 2 is a front view of an alternate mirror system which includes a rotary mirror having holes formed therein.

It is not necessary to employ split mirrors which are opened during an exposure interval. Any means for transmitting light from the object to the camera during an exposure may be employed. Semitransparent mirrors may be used without any mechanical motion but with some loss in illumination efficiency. Also a stationary mirror may be used with a hole cut in the center in alignment with the camera lens. This arrangement obviously detracts from the pose-reflecting properties of the system since there is always a blank unreflecting area at the center of the reflected image. Fig. 2 shows still another arrangement for a pose-reflecting mirror. In this system a circular mirror 33 is mounted on a shaft 34. Two or more holes 35 are cut in the mirror in the positions indicated. The subject views himself in a mirror area which is indicated in Fig. 2 by dotted lines 36. This area may be framed by suitable screening material so that only that portion of the mirror within area 36 may be viewed by the subject. When a picture is to be taken the subject or an operator presses a control button and shaft 34 together with mirror 33 turns in either direction moving one of the apertures 35 in an arc as indicated by lines 37 so that the aperture will pass in front of the camera lens 11 when the picture is taken.

The system of using a belt to move a camera mounted on a circular track as shown in Fig. 1 is convenient and is self-contained in a relatively small space as shown by Fig. 4. However, the track is not necessary and the system shown in Fig. 5 may be substituted. In this arrangement the camera 10 is mounted on a vertical bar 40 on which are secured two rotatable wheels 41, 42. These wheels roll on a raised platform 43 and support the entire weight of the camera and its attached mechanisms. In order to insure that the camera will always be pointed at the subject who is seated in a chair 44 a pivot arm 45 is secured to the rod 40 and is pivoted to a vertical support 46 directly under chair 44. The camera 10 together with rods 40 and 45 and the wheels 41, 42 are moved by the subject or an operator by means of arm 20 which fits into slots 21, 22 or 23 as shown in Fig. 1. In order to make the profile recording more accurate the chair 44 is moved to the right or left at the same time that the camera is moved to the left or right. This movement is accomplished by a simple pinioned gearing mounted underneath platform 43. A mitered pinion 47 is rotatably mounted with its shaft secured to the platform and a meshing mitered gear 48 is secured to pivot rod 45. Also a meshing mitered gear 50 is secured to a cylindrical hollow pipe 51 which is secured to the chair 44 and rotates on rod 46. In this manner when the camera is moved to its right hand position the chair is turned to point towards the left hand mirror and indicates in a definite manner the correct mirror for viewing by the subject.

Figure 3:
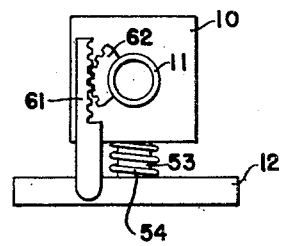
Fig. 3 is a front view of a camera structure which is used for automatic focussing of the camera lens when the camera is moved on a straight track.
Figure 8:
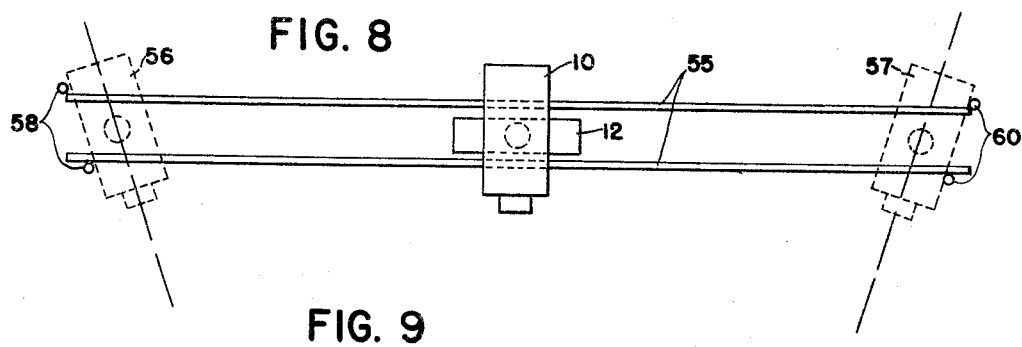
Fig. 8 is an alternate arrangement for moving the camera from one camera position to another on a straight track.

In cases where a lack of space or a simplified design necessitates the use of a straight track instead of a curved one the arrangement shown in Figs. 3 and 8 is employed. The camera 10 is mounted on a carriage 12 in the usual manner except that the camera is free to move about a central vertical axis supported on a rod 53. The camera is resiliently positioned by a helical spring 54 which tends to position the camera at right angles to the track 55 as indicated in Fig. 8. When the camera is moved to either one of its profile recording positions 56 or 57 a pair of stops 58 or 60 turns the camera as shown in the figure so that the optical axis points toward the subject. It will be obvious that the profile positions are farther away from the subject than the central position, therefore the lens must be adjusted for the longer distance. This is done by a rack and pinion arrangement shown in Fig. 3. When the camera is at its central position a rack 61 stands in the vertical position shown. When the camera is turned either clockwise or counter-clockwise the rack 61 is moved from its vertical position and the pinion 62 is moved a small amount changing the focus of the lens to accommodate the longer distance.

The control circuit for operating the camera shutter and for operating the complementary mirror sections is shown in Fig. 7. This control circuit includes a coin-operated device since there may be occasions for operating such a camera by a coin-in-a-slot mechanism. The circuit includes three sets of contacts corresponding to the three camera positions. Each set of contacts includes three normally open contact pairs, all three of which are closed when the camera is placed at that position. Fig. 7 shows the camera 10 with a contact arm 64 secured to the camera and arranged to close the contacts when the camera is correctly positioned. Three signal lights 65, 66 and 67 are connected in the circuit between a main supply line 68 and one of the contacts which is closed by the camera arm 64. One of the lamps is lighted when the camera is positioned properly and indicates the mirror into which the subject should look in order to correctly pose for a picture. In the circuit shown in Fig. 7 the camera is in the central position and lamp 66 will be lighted. The lamp circuit may be traced as follows: from conductor 68 by way of conductor 70 to the lamp 66, thence by conductor 71, contacts 72 which have been closed by camera arm 64, thence by conductors 73 and 74 to contacts 75 which are held closed by a coin 76 which has been dropped into a coin slot 77 by the operator, thence by conductor 78 and 80 to the other side of the source of supply. It will be noted that the signal lamp 66 will be lighted only when the camera 10 is in a position to close contacts 72 and a coin 76 has been dropped into a coin slot to close contacts 75.

The operator, after adjusting his pose, may now press button 28 and start the operation which will take the picture. The circuit closed by button 28 may be traced as follows: from conductor 68 over conductor 81 to a solenoid winding 82 through the contacts controlled by button 28, over conductors 83 and 84 to contacts 85 which are closed by the camera arm 64, then through contacts 72, over conductors 73 and 74 through contacts 75, to conductor 78, and back to conductor 80, the other side of the source of potential. It will be seen that this circuit is also dependent upon the proper positioning of the camera and the coin which closes contacts 75. If a complete circuit is made, solenoid winding 82 lifts a plunger 86 and energizes a one revolution clutch which is powered by a continuously running motor 87 coupled through a gear reducer 88. When the clutch is energized shaft 89 turns one revolution and carries with it a commutator disk 90 having three conductive strips mounted on its face, each one of which is connected to the shaft 89 and also connected by means of a brush 91 and conductor 92 to one side of the source of potential.

When disk 90 makes its revolution three circuits are completed by means of the three conductive strips. The first circuit to be completed may be traced from conductor 92, brush 91, to the outer conductive segment 93 and brush 94, thence over conductor 95 to a solenoid winding 96, contacts 97 which are closed by the camera arm, thence to conductor 70, and the other side of the source of potential 68. This circuit opens a light path to the camera lens 11 by the separation of mirror sections 25. A second circuit is completed by the commutator disk 90 which may be traced from brush 91, conductive sector 98, through brush 100, over conductor 101 to a shutter in front of lens 11, thence to conductor 68. It should be noted that the length and the position of conductive segments 93 and 98 cause the mirror sections to open first, then the shutter is opened and closed, and then a short time interval later the mirror sections are closed. A third circuit is completed by the rotation of disk 90 when the conductive segment 102 is revolved so that it makes contact with brush 103. This circuit may be traced from brush 91, conductor 102, brush 103, conductor 104, solenoid winding 105, conductor 106, and thence to the other side of the potential supply 68. When current flows through this circuit the winding 105 attracts a hinged flap 107 and permits coin 76 to fall to the bottom of a coin container 108 thereby opening contacts 75, extinguishing signal light 66 and breaking the circuit which passes through solenoid winding 82 so that any accidental or intended depression of button 28 will not produce any further action. If the operator wishes to take a second picture in this same position another coin must be inserted into slot 77.

If the camera 10 is positioned either on the right or left side of the camera mounting, thereby closing the contact sets associated with those positions, similar circuits will be set up to perform the same operations. It should be noted, however, that when the camera is on the right side closing contacts 109 signal lamp 65 in front of the left hand mirror is lighted even though the picture is taken through mirror sections 27. In a similar manner when the camera is positioned on the left side to take a left profile picture through mirror sections 26 signal lamp 67 is lighted because the subject is supposed to look in that direction to see his reflected image in mirrors 27.

Figure 9:
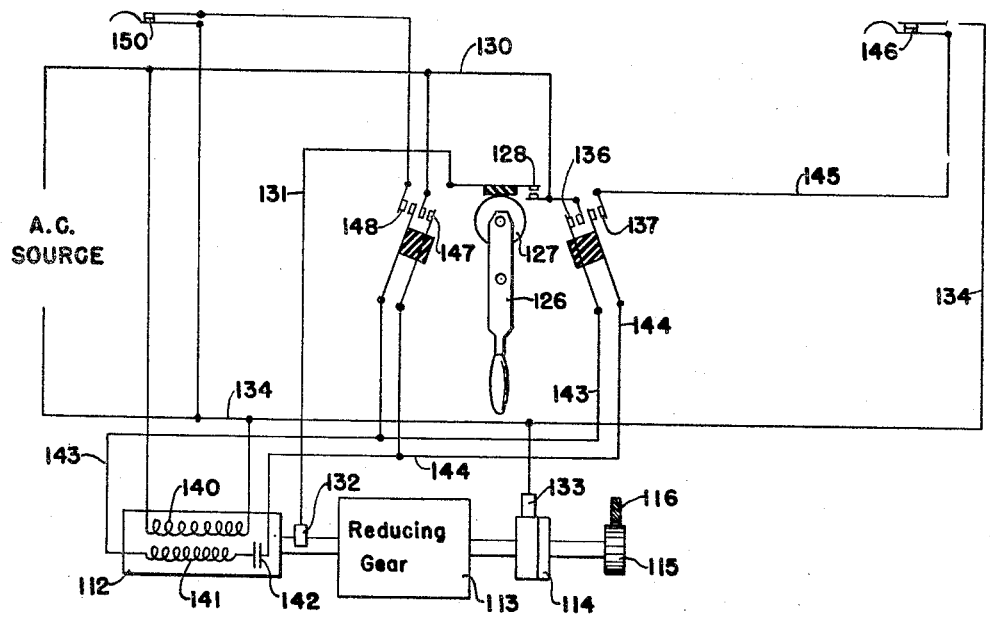
Fig. 9 is a wiring diagram showing the electrical connections when the camera is moved from one camera position to another under control of an electric motor.
Figure 10:
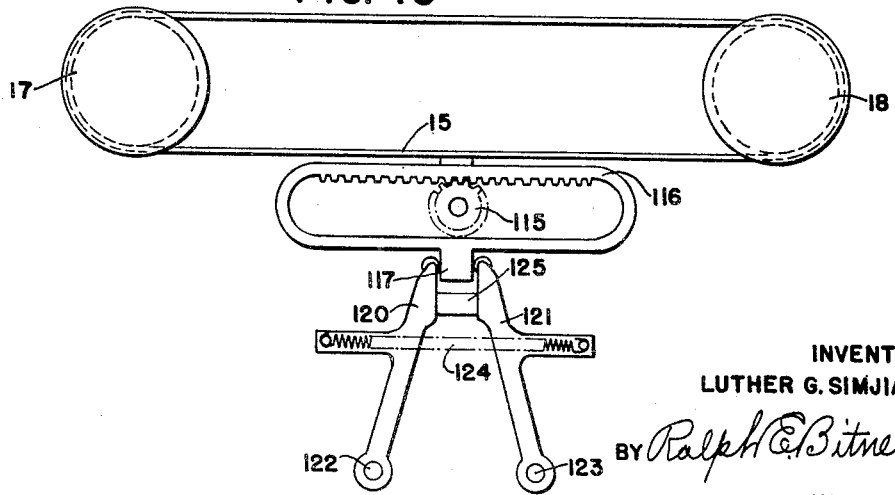
Fig. 10 is a front view of a mechanical system for use in conjunction with the wiring diagram shown in Fig. 9.

The above described operation relates to a movable camera mechanism which is positioned by hand, moving the arm 20 to any one of the three slots 21, 22, or 23. If it is desired to make the device more convenient and automatic by employing a motor to position the camera, this is done by a circuit which is shown in Fig. 9 and an additional mechanical device shown in Fig. 10. A reversing motor 112 is employed, coupled through a reversing gear 113, and a magnetically controlled clutch 114, to operate a gear 115 which meshes with a rack 116. As shown in Fig. 10 rack 116 is secured to belt 15 which turns on pulleys 17 and 18 to move the camera as explained in the above description regarding Figs. 1, 4, and 6. Rack 116 is held in position by a pair of slides (not shown) and the rack further includes an extension 117 which makes contact with two mechanical arms 120 and 121. These two arms are pivoted on stub shafts 122 and 123 and are resiliently connected by a long spring 124 which pulls the two arms toward each other and positions them on either side of a stationary block 125 secured to a portion of the cabinet which supports the camera track. It is the function of the motor to move the camera from a central position to either one or the other camera profile positions, retain the camera in the desired position until the picture is taken and then release clutch 114 and permit arms 120 and 121 together with spring 124 to return the camera to its central position.

The control circuit which accomplishes this result is shown in Fig. 9 and comprises connections for an alternating source and a three way control lever 126 which is manually set to either one of three positions for the camera movement. When lever 126 is set in the central position as indicated in the figure a roller 127 opens contacts 128 thereby breaking a circuit which was previously closed between one side of the source 130 and conductor 131 connected to brush 132 and one side of the electromagnetic clutch 114; the other side of the clutch being connected to brush 133 and conductor 134, the other side of the A. C. source. When lever 126 is set in a central position clutch 114 is disengaged and the camera is returned to its central position by means of spring 124.

If it is now desired to move the camera to the right hand profile position lever 126 is moved in a clockwise direction so that contacts 136 and 137 are closed and at the same time permitting contacts 128 to close. This action energizes the clutch 114 through contacts 128 and in addition starts the motor 112. Motor 112 includes a winding 140 which is connected at all times to the alternating current source. It also includes a winding 141 in series with a capacitor 142, the terminals of this circuit being connected to the movable contact points of contact pairs 136 and 137. When these contacts are closed a circuit is completed from conductor 130 through contacts 136 over conductor 143 to winding 141, capacitor 142, conductor 144, contacts 137, conductor 145, contacts 146, and the other side of the A. C. source 134. This makes the motor run in one direction which moves the camera to the right until the camera arm 164 opens contacts 146 at the right hand camera position and stops the motor. The camera will now remain in this position because it is coupled through clutch 114 reversing gear 113 to the motor armature and spring 124 is not strong enough to move this mass. If the lever arm 126 has been moved in a counter-clockwise direction to close contacts 147 and 148 a similar circuit would have been set up through these contacts and through contacts 150 to drive the motor in the reverse direction by reversing the phase of the current in winding 141.

While there have been described and illustrated specific embodiments of the invention, it will be obvious that various changes and modifications may be made therein without departing from the field of the invention which should be limited only by the scope of the appended claims.

I claim:

1. A photographic apparatus comprising in combination: a camera movable to any one of a plurality of preselected camera positions; guide means engaging said camera and adapted to cause said camera to be directed toward an object position when said camera is stationed at said preselected positions; a plurality of pose reflecting means, each associated with one camera position and disposed to intercept the optical axis between said camera position and said object position; each pose reflecting means having a reflecting surface toward said object position and adapted to permit passage of an image beam therethrough from said object position; said plurality of pose reflecting means angularly positioned with respect to one another so that the light from said object position reflected by a first pose reflecting means toward a second pose reflecting means as viewed from the object position in said second pose reflecting means is recorded by the camera moved to the camera position associated with said first pose reflecting means.

2. A photographic apparatus comprising in combination: a camera movable on a track and having means under control of an operator for placing said camera at any one of a plurality of preselected camera positions; guide means engaging the camera and adapted to cause said camera to be directed toward an object position when said camera is stationed at any one of said camera positions; a plurality of pose reflecting means, each associated with one camera position and disposed to intercept the optical axis between said camera position and said object position; each pose reflecting means having a reflecting surface toward said object position and adapted to permit passage of an image beam therethrough from said object position; said plurality of pose reflecting means angularly positioned with respect to one another so that the light from said object position reflected by a first pose reflecting means toward a second pose reflecting means as viewed from the object position in said second pose reflecting means is recorded by the camera moved to the camera position associated with said first pose reflecting means.

3. A photographic apparatus comprising in combination: a camera movable to any one of a plurality of preselected camera positions; guide means engaging said camera and adapted to cause said camera to be directed toward an object position when said camera is stationed at one of said camera positions; a plurality of pose reflecting means, each associated with one camera position and disposed to intercept the optical axis between said camera position and said object position; an indicator means, controlled by the position of the camera, which indicates the pose reflecting means showing the image of the object which will be recorded by the camera when an exposure is made; each pose reflecting means having a reflecting surface toward said object position and adapted to permit passage of an image beam therethrough from said position; said plurality of pose reflecting means angularly positioned with respect to one another so that the light from said object position reflected by a first pose reflecting means toward a second pose reflecting means as viewed from the object position in said second pose reflecting means is recorded by the camera moved to the camera position associated with said first pose reflecting means.

4. A photographic apparatus as set forth in claim 3 wherein said indicator means includes a light positioned adjacent to the said pose reflecting means showing the image of the object which will be recorded by the camera when an exposure is made.

5. A photographic apparatus comprising in combination: a camera movable to any one of a plurality of preselected camera positions; guide means engaging said camera and directing said camera toward an object position when the camera is stationed at one of said camera positions, said guide means including a guide which maintains the camera focussed on the object position; a plurality of pose reflecting means, each associated with one camera position and disposed to intercept the optical axis between said camera position and said object position; each pose reflecting means having a reflecting surface toward the object position and adapted to permit passage of an image beam therethrough from said object position; said plurality of pose reflecting means angularly positioned with respect to one another so that the light from said object position reflected by a first pose reflecting means toward a second pose reflecting means as viewed from the object position in said second pose reflecting means is recorded by the camera moved to the camera position associated with said first pose reflecting means.

6. A photographic apparatus as set forth in claim 5 wherein said guide means includes a circular guide which maintains the camera equidistant from the object position and focussed thereon.

7. A photographic apparatus as set forth in claim 5 wherein said guide means includes a structure pivoted at a point under the object position.

References Cited in the file of this patent

UNITED STATES PATENTS

| | | |
|---|---|---|
| 1,794,142 | Boston | Feb. 24, 1931 |
| 2,085,432 | Kean | June 29, 1937 |
| 2,386,276 | Simjian | Oct. 9, 1945 |
| 2,590,101 | Henschke | Mar. 25, 1952 |
| 2,625,857 | Simjian | Jan. 20, 1953 |